(12) United States Patent
Zhang et al.

(10) Patent No.: US 12,100,102 B2
(45) Date of Patent: Sep. 24, 2024

(54) IMAGE BASED SAMPLING METRIC FOR QUALITY ASSESSMENT

(71) Applicant: Tencent America LLC, Palo Alto, CA (US)

(72) Inventors: Xiang Zhang, Sunnyvale, CA (US); Chao Huang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 154 days.

(21) Appl. No.: 17/862,154

(22) Filed: Jul. 11, 2022

(65) Prior Publication Data

US 2023/0027519 A1  Jan. 26, 2023

Related U.S. Application Data

(60) Provisional application No. 63/221,365, filed on Jul. 13, 2021.

(51) Int. Cl.
*G06T 17/05* (2011.01)
*G06T 19/20* (2011.01)

(52) U.S. Cl.
CPC .............. *G06T 17/05* (2013.01); *G06T 19/20* (2013.01)

(58) Field of Classification Search
CPC ......... G06T 17/05; G06T 19/20; G06T 7/001; G06T 2207/30168; G06T 15/20
See application file for complete search history.

(56) References Cited

U.S. PATENT DOCUMENTS

| | | | | |
|---|---|---|---|---|
| 2008/0018732 | A1* | 1/2008 | Moller | H04N 13/363 348/E13.058 |
| 2008/0297502 | A1* | 12/2008 | Simard | G06T 7/97 345/420 |
| 2014/0340427 | A1* | 11/2014 | Baker | G06T 5/50 345/641 |
| 2015/0042752 | A1* | 2/2015 | Pettersson | H04N 13/106 348/42 |
| 2019/0068993 | A1* | 2/2019 | Aflaki Beni | H04N 13/344 |
| 2020/0273084 | A1* | 8/2020 | Annakov | G06T 19/006 |

OTHER PUBLICATIONS

Call for Proposals for Dynamic Mesh Coding, International Organization for Standardization Organisation Internationale De Normalisation ISO/IEC JTC1/SC29/WG11 Coding of Moving Pictures and Audio, MPEG2017/N16763, Online, Apr. 2021.

* cited by examiner

*Primary Examiner* — Sing-Wai Wu
(74) *Attorney, Agent, or Firm* — ArentFox Schiff LLP

(57) ABSTRACT

Aspects of the disclosure provide methods and apparatuses of quality assessment for three dimensional (3D) graphics modeling. In some examples, an apparatus for quality assessment includes processing circuitry. The processing circuitry determines an updated virtual camera position in response to a position change of a virtual camera for projection from a three-dimensional (3D) space to a two-dimensional (2D) space. The processing circuitry projects a reference 3D representation according to the updated virtual camera position to generate a reference 2D image, and projects a 3D representation under assessment according to the updated virtual camera position to generate an assessment 2D image. The processing circuitry calculates an assessment score associated with the updated virtual camera position based on the reference 2D image and the assessment 2D image.

20 Claims, 7 Drawing Sheets

IMAGE BASED SAMPLING METRIC FOR QUALITY ASSESSMENT

INCORPORATION BY REFERENCE

This present disclosure claims the benefit of priority to U.S. Provisional Application No. 63/221,365, "Image Based Sampling Metric for Mesh Quality Assessment" filed on Jul. 13, 2021, which is incorporated by reference herein in its entirety.

TECHNICAL FIELD

The present disclosure describes embodiments generally related to quality assessment for 3 dimensional (3D) graphics modeling.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication.

SUMMARY

Aspects of the disclosure provide methods and apparatuses of quality assessment for 3 dimensional (3D) graphics modeling. In some examples, an apparatus for quality assessment includes processing circuitry. The processing circuitry determines an updated virtual camera position in response to a position change of a virtual camera for projection from a three-dimensional (3D) space to a two-dimensional (2D) space. The processing circuitry projects a reference 3D representation according to the updated virtual camera position to generate a reference 2D image, and projects a 3D representation under assessment according to the updated virtual camera position to generate an assessment 2D image. The processing circuitry calculates an assessment score associated with the updated virtual camera position based on the reference 2D image and the assessment 2D image.

In some embodiments, the processing circuitry applies a rotation matrix of the position change to a prior virtual camera position to determine the updated virtual camera position. In some examples, the processing circuitry receives the rotation matrix as input parameters via a user interface.

In some embodiments, the processing circuitry determines a first plurality of updated virtual camera positions based on position changes of a plurality of virtual cameras. The processing circuitry projects the reference 3D representation according to the first plurality of updated virtual camera positions to generate a first plurality of reference 2D images associated with the first plurality of updated virtual camera positions, and projects the 3D representation under assessment according to the first plurality of updated virtual camera positions to generate a first plurality of assessment 2D images associated with the first plurality of updated virtual camera positions. The processing circuitry calculates a first plurality of assessment scores respectively associated with the first plurality of updated virtual camera positions based on the first plurality of reference 2D images and the first plurality of assessment 2D images. The processing circuitry calculates a weighted average assessment score of the first plurality of assessment scores.

In an example, the first plurality of updated virtual camera positions are evenly sampled on a sphere in the 3D space. In another example, the first plurality of updated virtual camera positions are randomly sampled on the sphere in the 3D space.

In some examples, the 3D representation under assessment includes a plurality of frames with corresponding frames in the reference 3D representation. The first plurality of updated virtual camera positions is used for projecting a first frame of the 3D representation under assessment and a first corresponding frame of the reference 3D representation. The processing circuitry determines a second plurality of updated virtual camera positions of the plurality of virtual cameras. The second plurality of updated virtual camera positions are used for projecting a second frame of the 3D representation under assessment and a second corresponding frame of the reference 3D representation.

In an example, the processing circuitry determines the second plurality of updated virtual camera positions of the plurality of virtual cameras based on a camera movement path.

In another example, the processing circuitry determines a first position in the second plurality of updated virtual camera positions based on a first camera movement path, and determines a second position in the second plurality of updated virtual camera positions based on a second camera movement path. The first position is associated with a first virtual camera in the plurality of virtual cameras, and the second position is associated with a second virtual camera in the plurality of virtual cameras.

In some examples, to calculate the weighted average assessment score of the first plurality of assessment scores, the processing circuitry determines weights for weighting the first plurality of assessment scores based on the projecting of the 3D representation under assessment; and calculates the weighted average assessment score based on the weights. In an example, the processing circuitry determines the weights for weighting the first plurality of assessment scores based on respective numbers of valid pixels that are projected in the first plurality of assessment 2D images. In another example, the processing circuitry determines the weights for weighting the first plurality of assessment scores based on respective distances of the 3D representation under assessment to projection planes corresponding to the first plurality of updated virtual camera positions.

In some examples, the 3D representation under assessment includes a plurality of frames with corresponding frames in the reference 3D representation. The first plurality of updated virtual camera positions is used for projecting a first frame of the 3D representation under assessment and a first corresponding frame of the reference 3D representation, the weighted average assessment score is a first frame level assessment score for the first frame. The processing circuitry determines a first frame weight for weighting the first frame level assessment score based on the first plurality of updated virtual camera positions. The processing circuitry calculates a final assessment score that is a weighted average score for the plurality of frames. The first frame level assessment score is weighted by the first frame weight in the final assessment score.

In an example, the processing circuitry determines the first frame weight based on a number of positions in the first plurality of updated virtual camera positions. In another example, the processing circuitry determines the first frame weight based on the positions of the first plurality of updated virtual camera positions.

In an example, the assessment score is calculated based on a peak signal-to-noise ratio (PSNR). In an example, the assessment score is calculated based on a structural similarity index metric (SSIM). In an example, the assessment score is calculated based on visual information fidelity (VIF). In an example, the assessment score is calculated based on a video multi-method assessment fusion (VMAF). In an example, the assessment score is calculated based on a blind/referenceless image spatial quality evaluator (BRISQUE). In an example, the assessment score is calculated based on a distortion identification-based image verity and integrity evaluation (DIIVINE).

Aspects of the disclosure also provide a non-transitory computer-readable medium storing instructions which when executed by a computer cause the computer to perform the method of quality assessment for 3D graphics modeling.

BRIEF DESCRIPTION OF THE DRAWINGS

Further features, the nature, and various advantages of the disclosed subject matter will be more apparent from the following detailed description and the accompanying drawings in which.

DETAILED DISCRETION OF EMBODIMENTS

Figure 1:
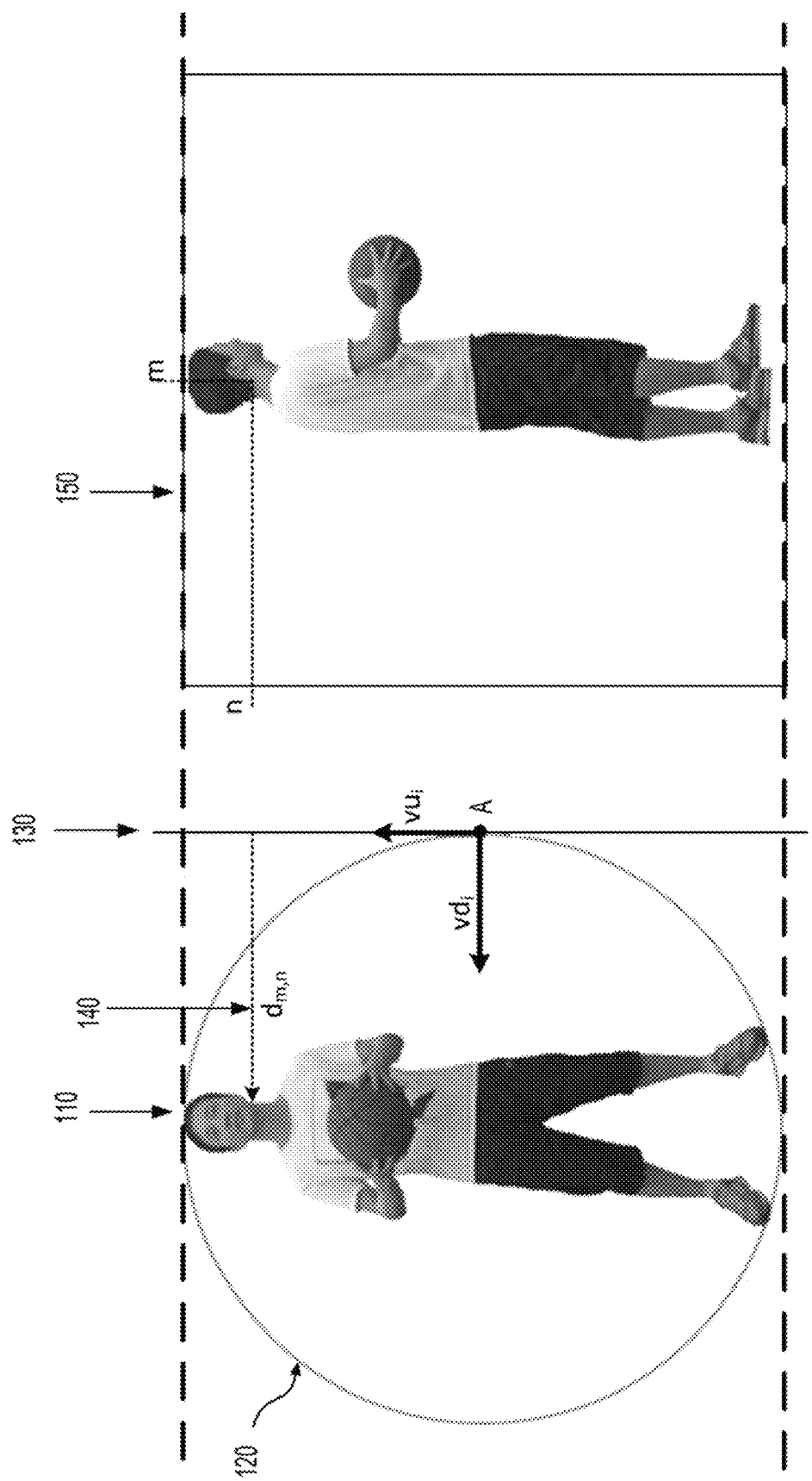
FIG. 1 shows a diagram illustrating an example of projecting from a three dimensional (3D) space to a two dimensional (2D) space in some examples.

Aspects of the disclosure provide techniques of quality assessment for 3D graphics modeling. In some examples, the techniques can improve the image-based sampling metric for quality assessment of three dimensional (3D) representations.

In some examples, point clouds and meshes can be used as 3D representations of the world. A point cloud is a set of points in a 3D space, each with associated attributes, e.g. color, material properties, texture information, intensity attributes, reflectivity attributes, motion related attributes, modality attributes, and various other attributes. Such point clouds may include large amounts of data and may be costly and time-consuming to store and transmit. In some examples, compression technologies can be developed to reduce the amount of data required to represent a point cloud for faster transmission or reduction of storage. For example, lossy compression of point clouds can be useful in real-time communications and six Degrees of Freedom (6 DoF) virtual reality. In some examples, a compression technology can be applied on an original 3D representation (e.g., original point cloud, original mesh and the like) to generate a point cloud with distortions to the original 3D representation.

A mesh (also referred to as polygon mesh in some examples) is a collection of vertices, edges and faces that defines the shape of a polyhedral object. The faces usually include triangles (triangle mesh), quadrilaterals (quads), or other simple convex polygons. In some examples, the faces can include concave polygons or even polygons with holes. In some examples, meshing techniques can be developed with the goal of increasing the speed or accuracy of the numerical calculations. In some examples, a meshing technique can be applied on an original 3D representation (e.g., original point cloud, original mesh and the like) to generate a new mesh with distortions to the original 3D representation.

According to an aspect of the disclosure, quality assessment of 3D representation can be performed using two types of approaches: a point-based approach and an image-based approach.

In some examples, to use the point-based approach, 3D representations are converted to point cloud representations. For example, to compare a first mesh with a second mesh, a surface sampling of the first mesh can generate a first point cloud representation associated with the first mesh, and a surface sampling of the second mesh can generate a second point cloud representation associated with the second mesh. Based on the first point cloud representation associated with the first mesh and the second point cloud representation associated with the second mesh, some metrics, such as peak signal to noise ration (PSNR), point cloud quality metric (PCQM), and the like can be calculated.

In some examples, a first 3D representation is a point cloud (referred to as a first point cloud), and a second 3D representation is a mesh. A surface sampling of the mesh can generate a second point cloud. Based on the first point cloud and the second point cloud, some metrics, such as peak signal to noise ration (PSNR), point cloud quality metric (PCQM), and the like can be calculated to compare the first 3D representation and the second 3D representation.

In some examples, to use the image-based approach, 3D representations are projected from the 3D space to the 2D space to. For example, 3D representations can be projected onto projection planes to generate two dimensional (2D) images, and the quality assessment of the 3D representations are based on the 2D images. Each of the 3D representations can be any suitable 3D representation, such as a point cloud, a mesh and the like. It is noted that, in some examples, a 2D image that is generated by projection from the 3D space to the 2D space can include a 2D matrix of color values (also referred to as color image), a 2D matrix of binary mask values (also referred to as mask image) and a 2D matrix of depth values (also referred to as depth image).

FIG. 1 shows a diagram illustrating an example of projecting a 3D representation (110) in a 3D space to render one or more 2D images (150) in a 2D space in some examples.

The 3D representation (110) can be a point cloud or a mesh. In the FIG. 1 example, a bounding sphere (120) of the 3D presentation (110) can be obtained. In an example, the bounding sphere (120) can be obtained by determining a bounding box (e.g., rectangular box) of the 3D representation (110), and determining the bounding sphere (120) based on a center and a diagonal of the bounding box.

In some examples, 2D images (150) can be generated based on a view direction, such as defined using a view direction vector $vd_i$, that points toward the center of the bounding sphere (120) in the 3D space.

In some examples, the 2D images (150) can be rendered using an orthogonal projection. A projection plane (130) for the view direction vector $vd_i$ is a plane tangent to the bounding sphere (120) and is perpendicular to the view direction vector $vd_i$.

In some examples, view directions can be described using virtual cameras for the projections from the 3D space to the 2D space. For example, a position of a virtual camera (also referred to as virtual camera position) is determined on the bounding sphere (120), the view direction is the direction from the virtual camera position to the center of the bounding sphere (120). In another example, when a view direction is determined, a straight line that is parallel to the view direction and passes the center of the bounding sphere (120) can intersect the bounding sphere at a virtual camera position. In the FIG. 1 example, when a virtual camera is placed at for example, a location A, the view direction of the virtual camera can be specified by the view direction vector $vd_i$. The 2D images (150) can be described as taken by a virtual camera that is placed at for example, location A and takes a picture of the 3D representation (120) in the view direction.

According to an aspect of the disclosure, the rendering result according to the view direction vector $vd_i$ can be a 2D image including a color image, a mask image and a depth image. In some examples, a color buffer stores the color image associated with the view direction vector $vd_i$; a mask buffer stores the mask image associated with the view direction vector $vd_i$; and a depth buffer stores the depth image associated with the view direction vector $vd_i$.

In some examples, the 3D representation (110) is a mesh, the color buffer can store, for each pixel (m,n), a color, such as an RGB value or other color format value, of a nearest projected triangle. In an example, the 3D representation (110) is a textured mesh, the RGB color can be obtained by bilinear interpolation of a texture map using triangle UV coordinates. In another example, the 3D representation (110) is a color per vertex mesh (no texture map), the color of the pixels can be determined based on blending the vertex colors using barycentric coordinates. The mask buffer can store, for each pixel (m,n), a binary value. The binary value for a pixel (m, n) is set to 1 if a projection for the pixel exists; otherwise, the binary value for the pixel is set to 0, in an example. The depth buffer can store, for each pixel (m,n), a distance $d_{m,n}$ (shown by (140) in FIG. 1) from the projection plane (130) to the 3D surface (a nearest intersection point of the view direction vector $vd_i$ from the pixel (m, n) on the projection plan to the mesh) in the 3D space.

In the FIG. 1 example, a color image is shown to illustrate a 2D image (150) that is rendered from projection according to the view direction that is specified by the view direction vector $vd_i$.

Figure 2:
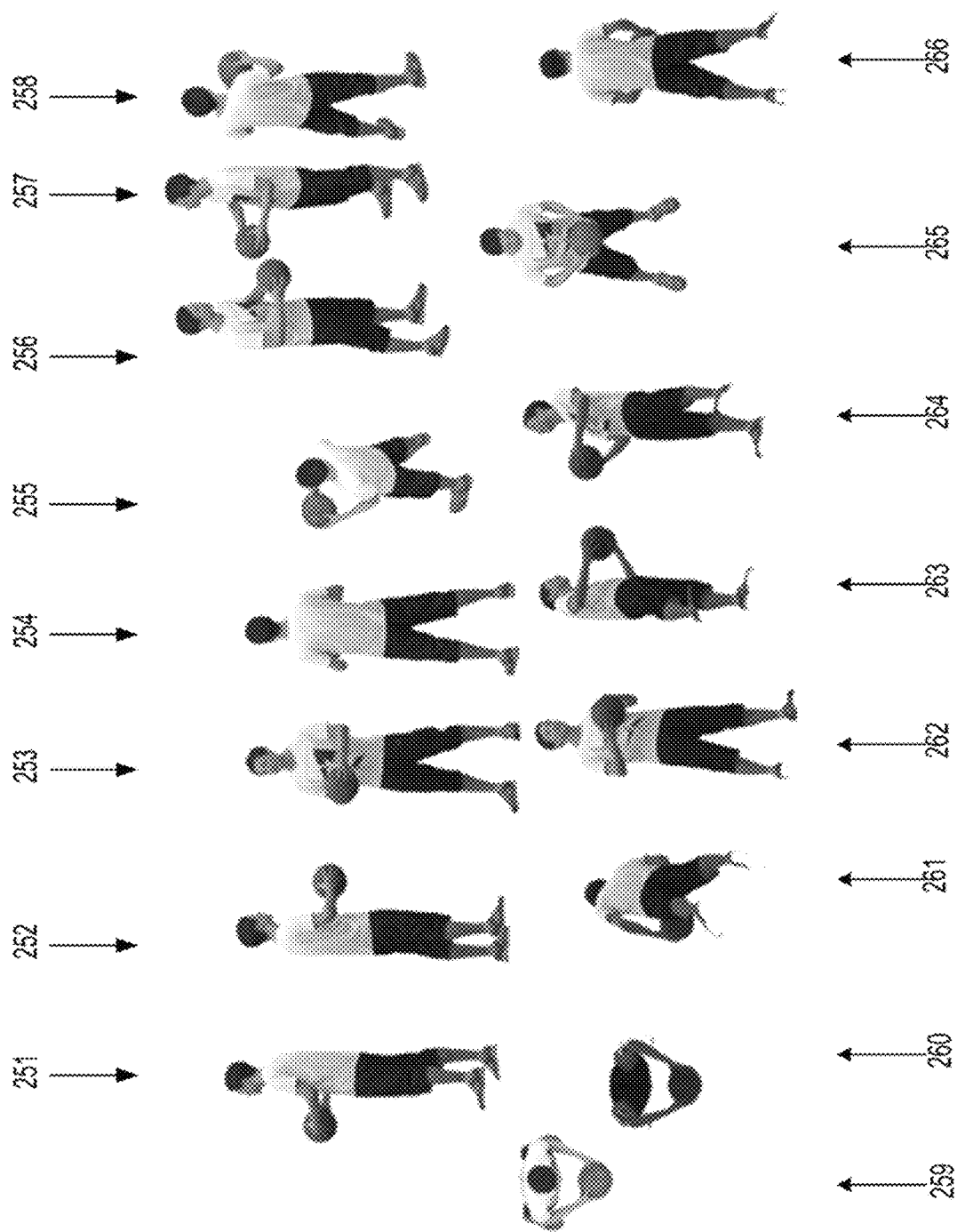
FIG. 2 shows 2D images that are rendered from 16 different view directions.

FIG. 2 shows 2D images (e.g., color images) (251)-(266) that are rendered from 16 different view directions.

According to some aspects of the disclosure, the image-based approach can calculate an assessment score using image-based sampling metric (IBSM) to assess, based on a reference 3D representation (also referred to as a first 3D representation), the quality of a 3D representation under assessment (also referred to as a second 3D representation). In some examples, the reference 3D representation is an original 3D representation, and the 3D representation under assessment is generated (e.g., according to a modeling technique) based on the original 3D representation. The 3D representation under assessment may have distortions to the original 3D representation.

In some examples, to calculate an assessment score using IBSM, multiple projection images are generated. For example, a first set of virtual cameras are placed at specific positions with regard to the first 3D representation to generate a first set of 2D images, and a second set of virtual cameras are placed at the corresponding positions with regard to the second 3D representation to generate a second set of 2D images. Then, assessment score of IBSM can be calculated based on the first set of 2D images and the second set of 2D images. It is noted that, in some examples, a virtual camera is used to specify a view direction. The first set of virtual cameras and the second set of virtual cameras can be placed at corresponding camera positions for the first 3D representation and the second 3D representation. The camera positions are associated with view directions. Thus, the first set of 2D images and the second set of 2D images are taken from the same view directions.

Specifically in some examples, a first color buffer stores a first set of color images associated with the view directions, a first mask buffer stores a first set of mask images associated the view directions and a first depth buffer stores a first set of depth images associated with the view directions. Similarly, a second color buffer stores a second set of color images associated with the view directions, a second mask buffer stores a second set of mask images associated with the view directions and a second depth buffer stores a second set of depth images associated with the view directions.

In some examples, the PSNR values for color images and depth images can be calculated for each view direction based on each pair of color buffers and depth buffers. The PSNR values for color images estimate the color distortions. In an example, a PSNR value is calculated based on a first color image in the first color buffer and a second color image in the second color buffer. The first color image and the second color image can have same view direction. The PSNR values for depth images estimate the geometry distortions. In an example, a PSNR value is calculated based on a first depth image in the first depth buffer and a second depth image in the second depth buffer. The first depth image and the second depth image can have same view direction.

In an example, a final PSNR value is calculated by averaging all PSNR values from different view directions and different temporal frames (e.g., a dynamic mesh that includes multiple frames of mesh).

Figure 3:
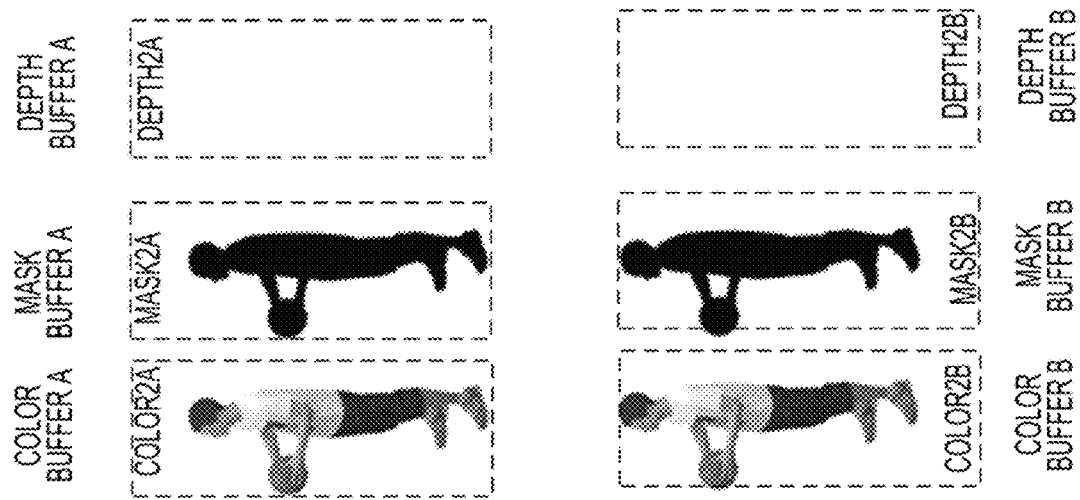
FIG. 3 shows a diagram illustrating a calculating of an image-based sampling metric in some examples.
Figure 3:
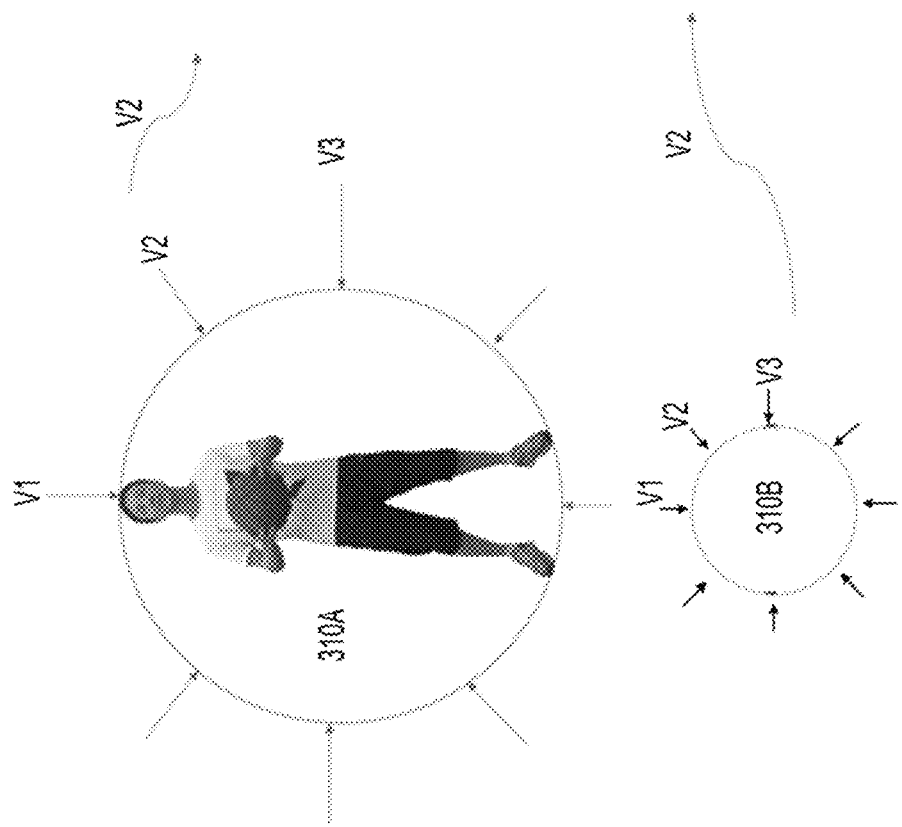

FIG. 3 shows a diagram illustrating a calculating an assessment value using an image-based sampling metric in some examples.

In the FIG. 3 example, a first 3D representation (310A) is a reference 3D representation, and a second 3D representation (310B) is a 3D representation under assessment.

In some examples, a set of view directions, such as shown by V1, V2, V3 and the like, is determined. According to the set of view directions, a first set of multiple projection images (also referred to as 2D images) is generated with regard to the first 3D representation (310A), and a second set of multiple projection images is generated with regard to the second 3D representation (310B). For example, according the view direction V2, a color image COLOR2A, a mask image MASK2A and a depth image DEPTH2A are generated from the first 3D representation (310A). The color image COLOR2A is stored in the color buffer A, the mask image MASK2A is stored in the mask buffer A and the depth image DEPTH2A is stored in the depth buffer A.

Similarly, according the view direction V2, a color image COLOR2B, a mask image MASK2B and a depth image DEPTH2B are generated from the second 3D representation (310B). The color image COLOR2B is stored in the color buffer B, the mask image MASK2B is stored in the mask buffer B and the depth image DEPTH2B is stored in the depth buffer B.

In some examples, the color buffer A can store color images of the first 3D representation (310A) projected from the view directions in the set of view directions. The mask buffer A can store mask images of the first 3D representation (310A) projected from the view directions in the set of view directions. The depth buffer A can store depth images of the first 3D representation (310A) projected from the view directions in the set of view directions. Similarly, the color buffer B can store color images of the second 3D representation (310B) projected from the view directions in the set of view directions. The mask buffer B can store mask images of the second 3D representation (310B) projected from the view directions in the set of view directions. The depth buffer B can store depth images of the second 3D representation (310B) projected from the view directions in the set of view directions.

In an example, mean squire error (MSE) can be used to calculate a difference between two images of the same view direction. For example, a color MSE value associated with the view direction V2 is calculated based on the color image COLOR2A and the color image COLOR2B; and a depth MSE value associated with the view direction V2 is calculated based on the depth image DEPTH2A and the depth image DEPTH2B. In an example, a color PSNR value associated with the view direction V2 is calculated based on the color MSE value, and a depth PSNR value associated with the view direction V2 is calculated based on the depth MSE value. In an example, a color assessment score is calculated as an average of color PSNR values associated with the view directions. In another example, a depth assessment score is calculated as an average of depth PSNR values associated with the view directions.

In some examples, the first 3D representation (310A) includes a plurality of frames and the second 3D representation (310B) includes a plurality of frames. In an example, frame level assessment scores, such as frame level color assessment score, frame level depth assessment score, and the like, are calculated for each pair of corresponding frames. Then, a color metric is calculated as an average of all of frame level color assessment scores, and a depth metric is calculated as an average of all of frame level depth assessment scores.

In some examples, a final assessment value is calculated by averaging all PSNR values (e.g., color PSNR values, depth PSNR values for all view directions and frames if multiple frames of mesh exist). The final assessment score is used to evaluate the quality of the second 3D representation (310B).

In some related examples, the view directions (also referred to as virtual camera positions) are fixed once the number of view directions is determined. Further, the final assessment score is obtained by averaging the PSNRs from different view directions and frames, regardless of the differences in spatial and temporal domains. According to an aspect of the disclosure, the PSNR values may not correlate strongly enough with human visual perception.

Some aspects of the disclosure provide techniques to improve the IBSM metric for quality assessment of 3D representations. The techniques can be applied individually or can be applied by any form of combinations.

According to an aspect of the disclosure, positions of virtual cameras (correspond to view directions) for comparing 3D representations can be changed. The virtual camera positions can be changed, rather than fixed all the time.

In some embodiments, the changes of the virtual camera positions can be applied to initial virtual camera positions. The initial virtual camera positions on the bounding sphere of the 3D representations can be determined by any means, such as using Fibonacci sphere lattice and the like.

In some examples, a rotation matrix is applied on the initial virtual camera positions to rotate the virtual camera positions around the bounding sphere (for 3D representations), and to determine updated virtual camera positions. The updated virtual camera positions are used to generate 2D images, and the 2D images are used for quality assessment. In some examples, the rotation matrix can be specified by user input parameters, such as input parameters received from a user interface. In an example, the rotation matrix can be determined based on a rotation axis with a rotation magnitude. In another example, the rotation matrix can be obtained from three rotation angles along different axes in a predefined order (a.k.a., the yaw, pitch, roll representation). In another example, the rotation matrix can be represented by the quaternion representation.

In some embodiments, the virtual camera positions are evenly sampled (e.g., placed, distributed) on the bounding sphere of 3D representations. In some embodiments, the virtual camera positions are randomly sampled (e.g., placed, distributed) on the bounding sphere of 3D representations.

In some embodiments, the virtual camera positions can be changed over time. In some examples, a 3D representation includes multiple frames with different time stamps. In an example, each frame may have a different virtual camera position arrangement. In some examples, a position of a virtual camara can change from frame to frame. In an example, the position of the virtual camera can change according to a camera movement path on the bounding sphere. In some examples, the virtual cameras may have a same or different camera movement path(s) on the bounding sphere. In an example, the camera movement path(s) can be fix. In another example, the camera movement path(s) is(are) specified by the user input(s), for example as input parameters received from a user interface.

According to an aspect of the disclosure, adaptive weighting techniques can be used. For example, instead of averaging assessment scores (e.g., PSNR values) across space (e.g., virtual camera positions, virtual cameras) and time (e.g., frames), more adaptive weighting strategies can be applied in calculating the final assessment score for 3D representation under assessment.

In some examples, an assessment score for each frame can be calculated as weighted sum from each virtual camera. For example, Eq. (1) can be used to calculate an assessment score for $i^{th}$ frame:

$$F_i = \frac{\sum_j S_i^j \cdot W_i^j}{\sum_j W_i^j} \qquad \text{Eq. (1)}$$

where $S_i^j$ denotes the assessment score for the $j^{th}$ virtual camera in the $i^{th}$ frame. In an example, the assessment score can be a color PSNR value calculated based on the color buffers or a depth PSNR value calculated based on the depth buffers or any other metrics. $W_i^j$ denotes the weighting factor for the score $S_i^j$. $F_i$ denotes the weighted assessment score for the $i^{th}$ frame. The weight $W_i^j$ can take account of different factors, including the number of valid pixels in the rendered image (projected image), the distance to the viewpoint, and the like.

In an example, when a first number of valid pixels in a first projected image is larger than a second number of valid pixels in a second projected image, a larger weight is assigned to the first projected image. In an example, the number of valid pixels of a projected image can be determined by the number of "1" in the mask image of the projected image.

In an example, the distance to the viewpoint is calculated using an average distance of points to the projection plane. In an example, the distance to the viewpoint is calculated using an average depth value of the valid depth values in the depth image of the projected image.

Further, a final assessment score can be the weighted sum from the scores of frames, which can be formulated as shown in Eq. (2):

$$F = \frac{\sum_i F_i \cdot T_i}{\sum_i T_i} \qquad \text{Eq. (2)}$$

where $T_i$ denotes the weighting factor for the $i^{th}$ frame, and F denotes the final assessment score weighted across all frames. The weight $T_i$ can take account of different factors, including the number of virtual cameras in each frame, the virtual camera positions, etc. In an example, different numbers of virtual cameras are used for projection of different frames. A frame with a larger number of virtual cameras (larger number of projected 2D images) may have a larger weight. In another example, different virtual camera positions may generate images with different valid number of pixels, or different distance to the viewpoint. When the virtual camera positions are different for each frame, the weights for frames can take account of the virtual camera position difference.

According to an aspect of the disclosure, additional objective metrics can be used in the quality evaluation of the 3D representations. The objective metrics can have better correlation to human visual perception than PSNR, and can be used on evaluating the quality of rendered frames, rather than simply calculating the PSNR.

In some embodiments, some metrics, such as structural similarity index metric (SSIM), visual information fidelity (VIF), video multi-method assessment fusion (VMAF) and the like, may be used to determine the quality of the 3D representation under assessment (e.g., a point cloud under assessment, a mesh under assessment) based on a 3D reference representation (reference mesh, reference point cloud and the like). In an example, an original mesh is used as the 3D reference representation for quality assessment of a compressed mesh (may have distortion to the original mesh). The metrics, such as SSIM, VIF, VMAF and the like, may be used to determine the quality of the compressed mesh based on the original mesh.

In some embodiments, some metrics, such as blind/referenceless image spatial quality evaluator (BRISQUE), distortion identification based image verity and integrity evaluation (DIIVINE), and the like can determine the quality of the 3D representation under assessment (e.g., a point cloud under assessment, a mesh under assessment) using reduced-reference or no-reference. In an example, no original mesh is needed to perform quality assessment of a compressed mesh. In another example, only partial of the original mesh is needed to perform quality assessment of the compressed mesh.

Figure 4:
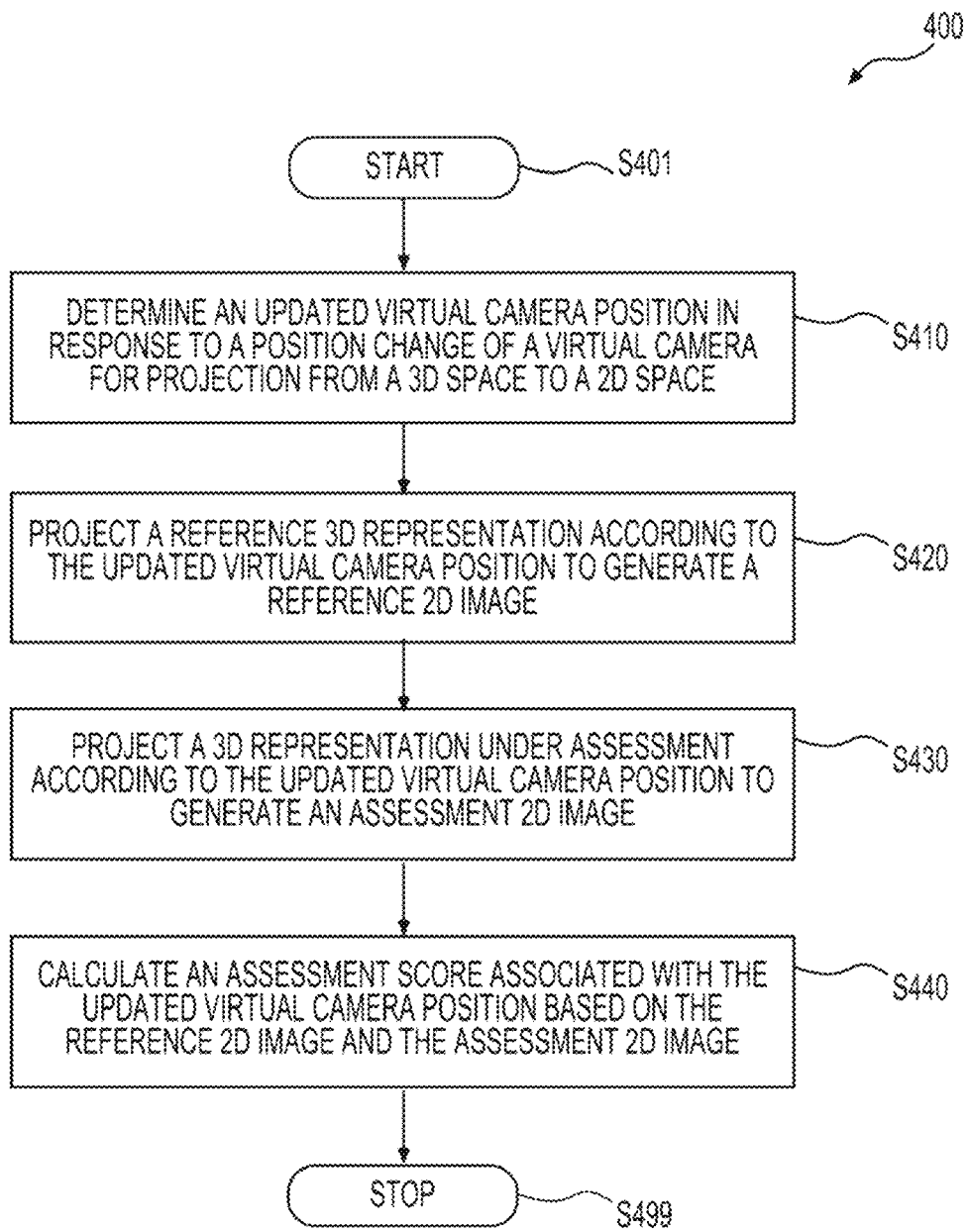
FIG. 4 shows a flow chart outlining another process according to some embodiment of the disclosure.

FIG. 4 shows a flow chart outlining a process (400) according to an embodiment of the disclosure. The process (400) can be used in a quality assessment of 3D representations. In some embodiments, the process (400) is implemented in software instructions, thus when the processing circuitry executes the software instructions, the processing circuitry performs the process (400). The process starts at (S401) and proceeds to (S410).

At (S410), an updated virtual camera position is determined in response to a position change of a virtual camera. The virtual camera is used for projection from a three-dimensional (3D) space to a two-dimensional (2D) space.

In some examples, a rotation matrix of the position change is applied to a prior virtual camera position to determine the updated virtual camera position. In an example, the rotation matrix can be received as input parameters via a user interface.

At (S420), a reference 3D representation is projected according to the updated virtual camera position to generate a reference 2D image. The reference 3D representation can be a point cloud or a mesh. The reference 2D image can include a color image, a mask image and a depth image.

At (S430), a 3D representation under assessment is projected according to the updated virtual camera position to generate an assessment 2D image. The 3D representation under assessment can be a point cloud or a mesh. The assessment 2D image can include a color image, a mask image and a depth image.

At (S440), an assessment score associated with the updated virtual camera position is calculated based on the reference 2D image and the assessment 2D image.

In some embodiments, the quality assessment uses a plurality of virtual cameras. In some examples, a first plurality of updated virtual camera positions are determined based on position changes of the plurality of virtual cameras. The reference 3D representation is projected according to the first plurality of updated virtual camera positions to generate a first plurality of reference 2D images associated with the first plurality of updated virtual camera positions. The 3D representation under assessment is projected according to the first plurality of updated virtual camera positions to generate a first plurality of assessment 2D images associated with the first plurality of updated virtual camera positions. A first plurality of assessment scores respectively associated with the first plurality of updated virtual camera positions can be calculated based on the first plurality of reference 2D images and the first plurality of assessment 2D images. Then, a weighted average assessment score of the first plurality of assessment scores can be calculated.

In an embodiment, the first plurality of updated virtual camera positions are evenly sampled on a sphere in the 3D space. In another embodiment, the first plurality of updated virtual camera positions are randomly sampled on the sphere in the 3D space.

In some examples, the 3D representation under assessment includes a plurality of frames with corresponding frames in the reference 3D representation. The first plurality of updated virtual camera positions is used for projecting a first frame of the 3D representation under assessment and a first corresponding frame of the reference 3D representation. In some examples, a second plurality of updated virtual camera positions of the plurality of virtual cameras can be determined. The second plurality of updated virtual camera positions is used for projecting a second frame of the 3D representation under assessment and a second corresponding frame of the reference 3D representation. In an example, the second plurality of updated virtual camera positions of the plurality of virtual cameras can be determined based on a camera movement path.

In another example, a first position in the second plurality of updated virtual camera positions is determined based on a first camera movement path. The first position is associated with a first virtual camera in the plurality of virtual cameras. A second position in the second plurality of updated virtual camera positions is determined based on a second camera movement path. The second position is associated with a second virtual camera in the plurality of virtual cameras.

In some examples, to calculate the weighted average assessment score of the first plurality of assessment scores, weights for weighting the first plurality of assessment scores are determined based on the projecting of the 3D representation under assessment, and the weighted average assessment score is calculated based on the weights. In an example, the weights for weighting the first plurality of assessment scores are determined based on respective numbers of valid pixels that are projected in the first plurality of assessment 2D images. In another example, the weights for weighting the first plurality of assessment scores are determined based on respective distances of the 3D representation under assessment to projection planes corresponding to the first plurality of updated virtual camera positions.

In some examples, the 3D representation under assessment includes a plurality of frames with corresponding frames in the reference 3D representation, the first plurality of updated virtual camera positions is used for projecting a first frame of the 3D representation under assessment and a first corresponding frame of the reference 3D representation, and the weighted average assessment score is a first frame level assessment score for the first frame. In some examples, a first frame weight for weighting the first frame level assessment score is determined based on the first plurality of updated virtual camera positions. A final assessment score that is a weighted average score for the plurality of frames is calculated. The first frame level assessment score is weighted by the first frame weight in the final assessment score. In an example, the first frame weight is determined based on a number of positions in the first plurality of updated virtual camera positions. In another example, the first frame weight is determined based on the positions of the first plurality of updated virtual camera positions.

In an embodiment, the assessment score is calculated based on a peak signal-to-noise ratio (PSNR). In another embodiment, the assessment score is calculated based on a structural similarity index metric (SSIM). In another embodiment, the assessment score is calculated based on visual information fidelity (VIF). In another embodiment, the assessment score is calculated based on a video multi-method assessment fusion (VMAF). In another embodiment, the assessment score is calculated based on a blind/referenceless image spatial quality evaluator (BRISQUE). In another embodiment, the assessment score is calculated based on a distortion identification based image verity and integrity evaluation (DIIVINE).

Then, the process proceeds to (S499) and terminates.

The process (400) can be suitably adapted. Step(s) in the process (400) can be modified and/or omitted. Additional step(s) can be added. Any suitable order of implementation can be used.

Figure 5:
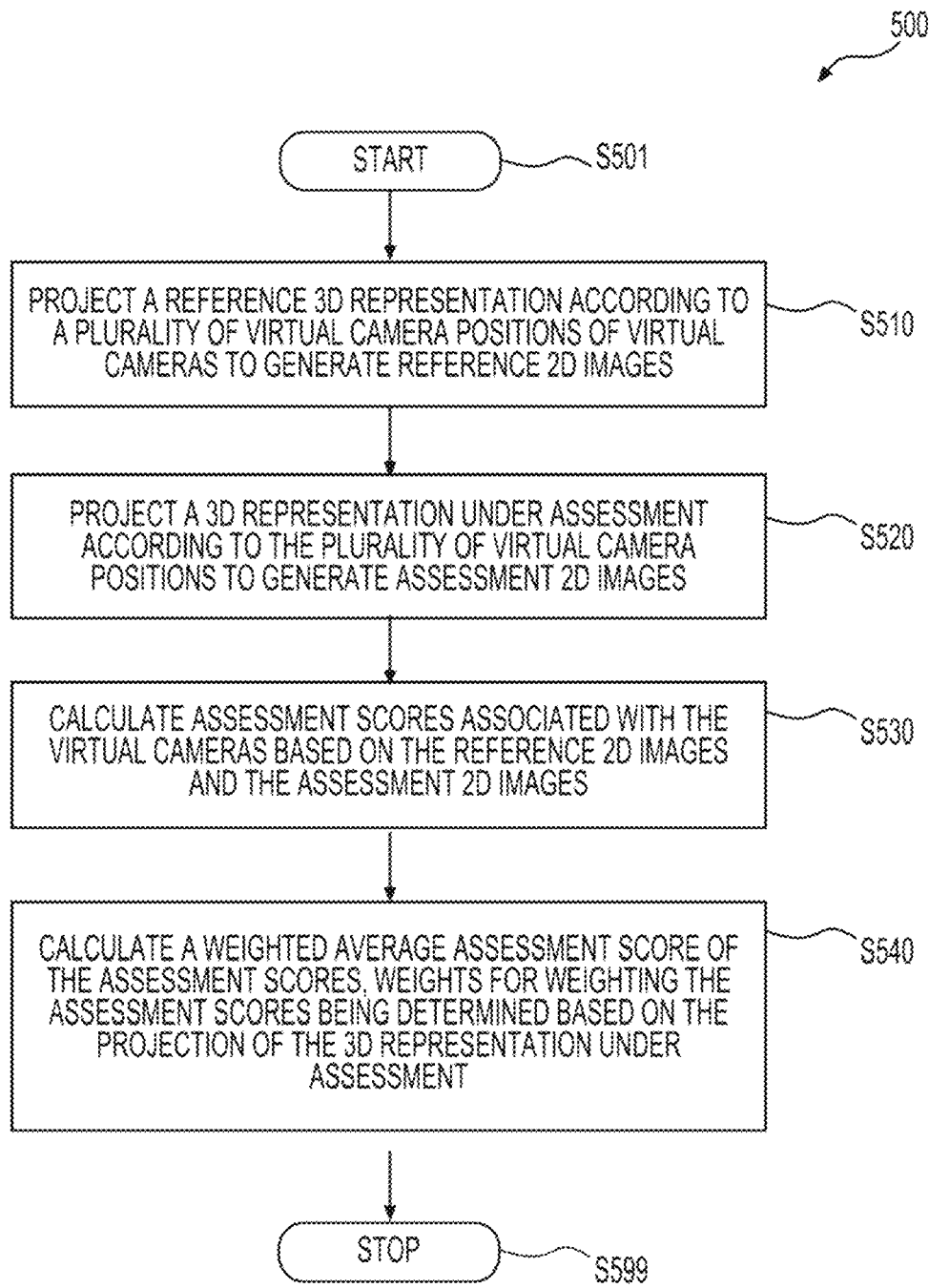
FIG. 5 shows a flow chart outlining another process according to some embodiment of the disclosure.

FIG. 5 shows a flow chart outlining a process (500) according to an embodiment of the disclosure. The process (500) can be used in a quality assessment of 3D representations. In some embodiments, the process (500) is implemented in software instructions, thus when the processing circuitry executes the software instructions, the processing circuitry performs the process (500). The process starts at (S501) and proceeds to (S510).

At (S510), a reference three dimensional (3D) representation is projected according to a plurality of virtual camera positions of virtual cameras to generate reference two dimensional (2D) images. The virtual cameras are used for projection from a 3D space to a 2D space. In an example, the plurality of virtual camera positions are fixed positions. In another example, the plurality of virtual camera positions may change from frame to frame.

At (S520), a 3D representation under assessment is projected according to the plurality of virtual camera positions of the virtual cameras to generate assessment 2D images.

At (S530), assessment scores associated with the virtual cameras can be calculated based on the reference 2D images and the assessment 2D images.

At (S540), a weighed average assessment score of the assessment scores for the 3D representation under assessment is calculated. Weights for weighting the assessment scores are determined based on the projecting of the 3D representation under assessment.

In some examples, the weights for weighting the assessment scores are determined based on respective numbers of valid pixels that are projected in the assessment 2D images. In some examples, the weights for weighting the assessment scores are determined based on respective distances of the 3D representation under assessment to projection planes corresponding to the plurality of virtual camera positions.

In some examples, the 3D representation under assessment includes a plurality of frames with corresponding frames in the reference 3D representation. The weighted average assessment score is a first frame level assessment score for a first frame. A first frame weight for weighting the first frame level assessment score is determined based on the plurality of virtual camera positions. A final assessment score that is a weighted average score for the plurality of frames is calculated. The final assessment score includes the first frame level assessment score that is weighted by the first frame weight. In an example, the first frame weight is determined based on a number of positions in the plurality of virtual camera positions. In another example, the first frame weight is determined based on the positions of the plurality of virtual camera positions.

In an embodiment, the assessment scores are calculated based on a peak signal-to-noise ratio (PSNR). In another embodiment, the assessment scores are calculated based on a structural similarity index metric (SSIM). In another embodiment, the assessment scores are calculated based on VIF. In another embodiment, the assessment scores are calculated based on a video multi-method assessment fusion (VMAF). In another embodiment, the assessment scores are calculated based on a blind/referenceless image spatial quality evaluator (BRISQUE). In another embodiment, the assessment scores are calculated based on a distortion identification based image verity and integrity evaluation (DIIVINE).

Then, the process proceeds to (S599) and terminates.

The process (500) can be suitably adapted. Step(s) in the process (500) can be modified and/or omitted. Additional step(s) can be added. Any suitable order of implementation can be used.

Figure 6:
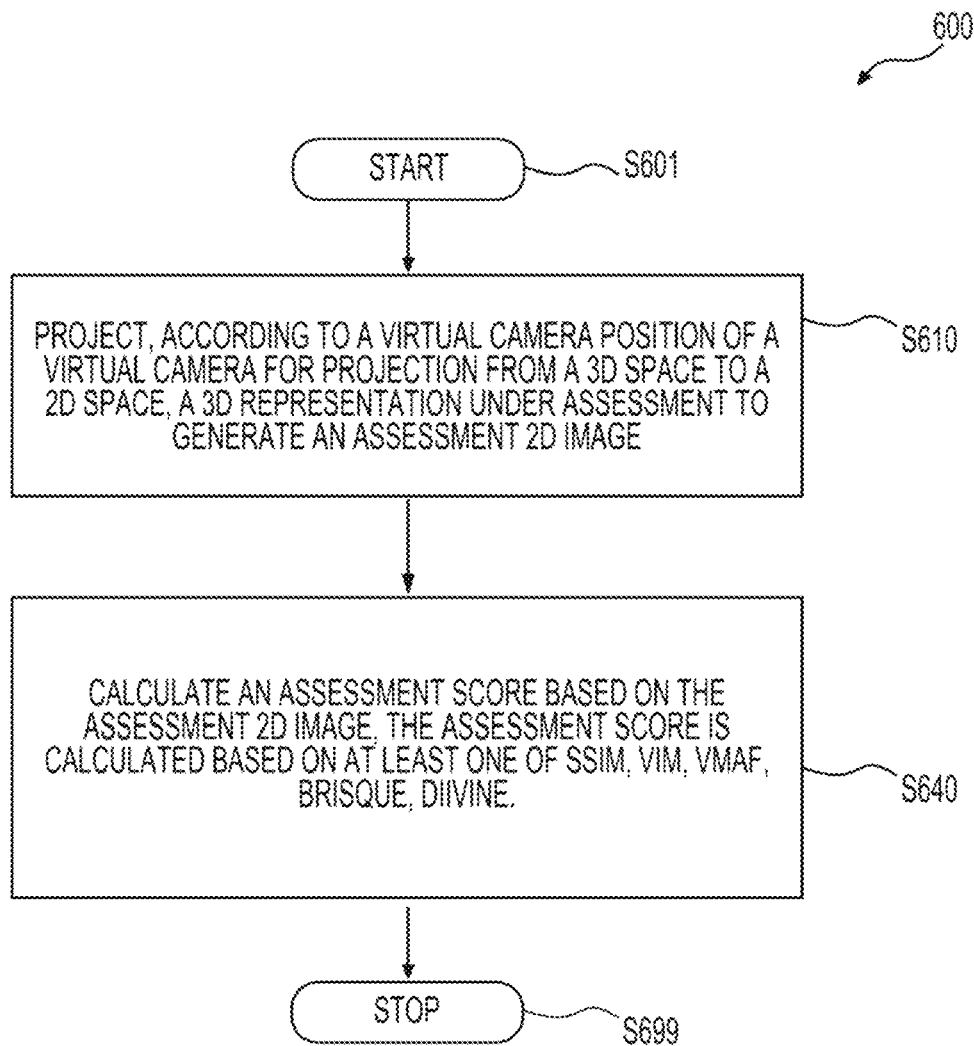
FIG. 6 shows a flow chart outlining another process according to some embodiment of the disclosure.

FIG. 6 shows a flow chart outlining a process (600) according to an embodiment of the disclosure. The process (600) can be used in a quality assessment of 3D representations. In some embodiments, the process (600) is implemented in software instructions, thus when the processing circuitry executes the software instructions, the processing circuitry performs the process (600). The process starts at (S601) and proceeds to (S610).

At (S610), according to a virtual camera position of a virtual camera for projecting from a three-dimensional (3D) space to a two-dimensional (2D) space, a 3D representation under assessment is projected to generate an assessment 2D image.

At (S620), an assessment score is calculated based on the assessment 2D image. In an embodiment, the assessment score is calculated based on a structural similarity index metric (SSIM). In another embodiment, the assessment score is calculated based on visual information fidelity (VIF). In another embodiment, the assessment score is calculated based on a video multi-method assessment fusion (VMAF). In another embodiment, the assessment score is calculated based on a blind/referenceless image spatial quality evaluator (BRISQUE). In another embodiment, the assessment score is calculated based on a distortion identification based image verity and integrity evaluation (DIIVINE).

In some examples, when a metric require reference, a 3D reference representation can be projected according to the virtual camera position of the virtual camera to generate a reference 2D image.

Then, the process proceeds to (S699) and terminates.

The process (600) can be suitably adapted. Step(s) in the process (600) can be modified and/or omitted. Additional step(s) can be added. Any suitable order of implementation can be used.

The techniques described above, can be implemented as computer software using computer-readable instructions and physically stored in one or more computer-readable media. For example, FIG. 7 shows a computer system (700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
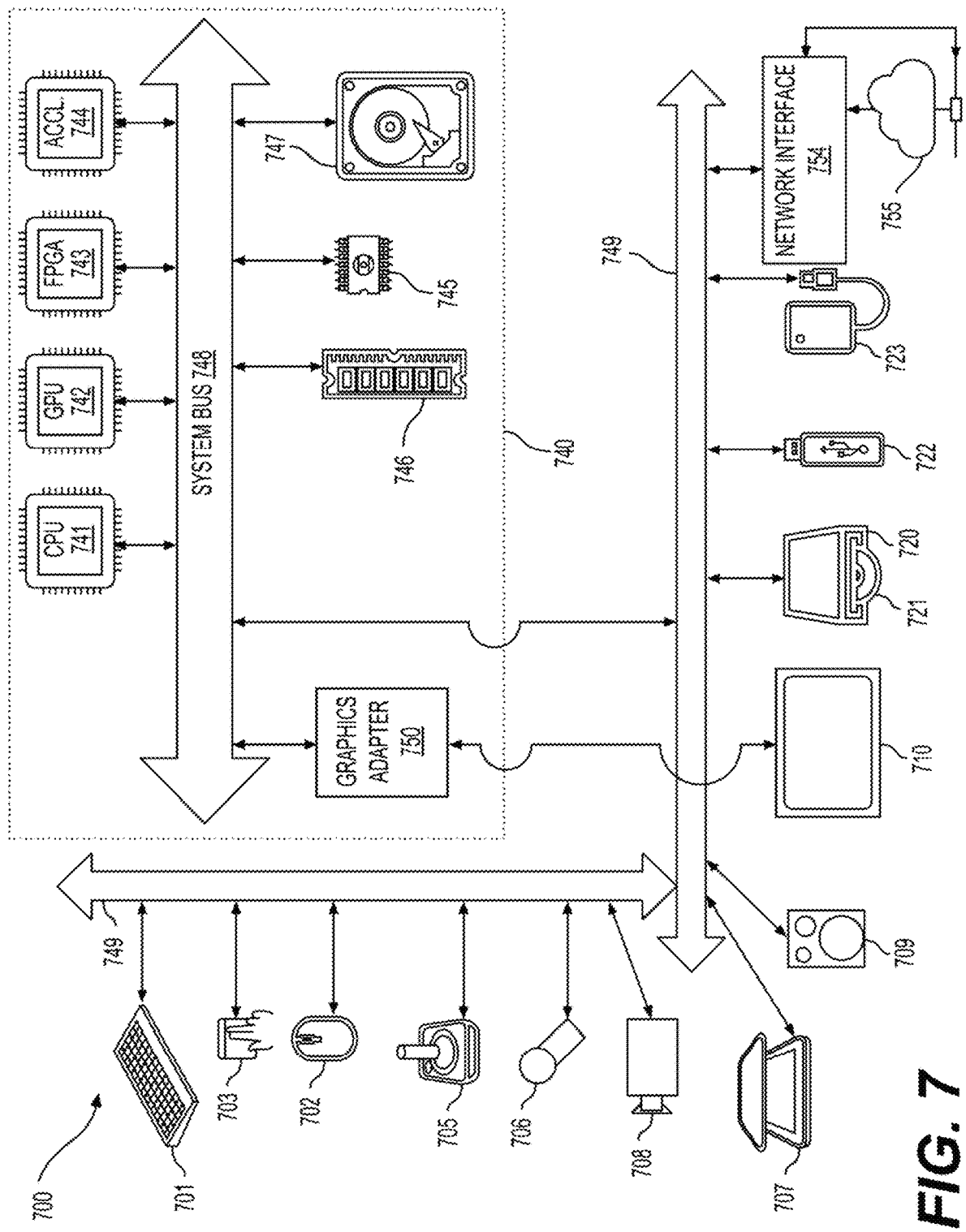
FIG. 7 is a schematic illustration of a computer system in accordance with an embodiment.

The components shown in FIG. 7 for computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can be also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for quality assessment, comprising:
    determining a first plurality of updated virtual camera positions in response to position changes of a plurality of virtual cameras for projection from a three-dimensional (3D) space to a two-dimensional (2D) space;
    projecting a reference 3D representation according to the first plurality of updated virtual camera positions to generate a first plurality of reference 2D images associated with the first plurality of updated virtual camera positions;
    projecting a 3D representation under assessment according to the first plurality of updated virtual camera positions to generate a first plurality of assessment 2D images associated with the first plurality of updated virtual camera positions, the 3D representation under assessment including a plurality of frames with corresponding frames in the reference 3D representation, the first plurality of updated virtual camera positions being used for projecting a first frame of the 3D representation under assessment and a first corresponding frame of the reference 3D representation;
    calculating a first plurality of assessment scores respectively associated with the first plurality of updated virtual camera positions based on the first plurality of reference 2D images and the first plurality of assessment 2D images;
    calculating a weighted average assessment score of the first plurality of assessment scores; and
    determining a second plurality of updated virtual camera positions of the plurality of virtual cameras, the second plurality of updated virtual camera positions being used for projecting a second frame of the 3D representation under assessment and a second corresponding frame of the reference 3D representation.

2. The method of claim 1, wherein the determining the first plurality of updated virtual camera positions further comprises:
    applying a rotation matrix of the position change of one of the plurality of virtual cameras to a prior virtual camera position of the one of the plurality of virtual cameras to determine the updated virtual camera position of the one of the plurality of virtual cameras.

3. The method of claim 2, further comprising:
    receiving the rotation matrix as input parameters via a user interface.

4. The method of claim 1, wherein the first plurality of updated virtual camera positions are evenly sampled on a sphere in the 3D space or are randomly sampled on the sphere in the 3D space.

5. The method of claim 1, further comprising:
    determining the second plurality of updated virtual camera positions of the plurality of virtual cameras based on a camera movement path.

6. The method of claim 1, further comprising:
- determining a first position in the second plurality of updated virtual camera positions based on a first camera movement path, the first position being associated with a first virtual camera in the plurality of virtual cameras; and
- determining a second position in the second plurality of updated virtual camera positions based on a second camera movement path, the second position being associated with a second virtual camera in the plurality of virtual cameras.

7. The method of claim 1, wherein the calculating the weighted average assessment score of the first plurality of assessment scores further comprises:
- determining weights for weighting the first plurality of assessment scores based on the projecting of the 3D representation under assessment; and
- calculating the weighted average assessment score based on the weights.

8. The method of claim 7, further comprising:
- determining, the weights for weighting the first plurality of assessment scores based on at least one of:
  - respective numbers of valid pixels that are projected in the first plurality of assessment 2D images; and
  - respective distances of the 3D representation under assessment to projection planes corresponding to the first plurality of updated virtual camera positions.

9. The method of claim 7, wherein the weighted average assessment score is a first frame level assessment score for the first frame, and the method further comprises:
- determining a first frame weight for weighting the first frame level assessment score based on the first plurality of updated virtual camera positions; and
- calculating a final assessment score that is a weighted average score for the plurality of frames, the first frame level assessment score being weighted by the first frame weight in the final assessment score.

10. The method of claim 9, wherein the determining the first frame weight comprises:
- determining the first frame weight based on at least one of:
  - a number of positions in the first plurality of updated virtual camera positions; and
  - the positions of the first plurality of updated virtual camera positions.

11. The method of claim 1, wherein the assessment score comprises at least one of a peak signal-to-noise ratio (PSNR), a structural similarity index metric (SSIM), visual information fidelity (VIF), a video multi-method assessment fusion (VMAF), a blind/referenceless image spatial quality evaluator (BRISQUE), and a distortion identification based image verity and integrity evaluation (DIIVINE).

12. An apparatus for quality assessment, comprising processing circuitry configured to:
- determine a first plurality of updated virtual camera positions in response to position changes of a plurality of virtual cameras for projection from a three-dimensional (3D) space to a two-dimensional (2D) space;
- project a reference 3D representation according to the first plurality of updated virtual camera positions to generate a first plurality of reference 2D images associated with the first plurality of updated virtual camera positions;
- project a 3D representation under assessment according to the first plurality of updated virtual camera positions to generate a first plurality of assessment 2D images associated with the first plurality of updated virtual camera positions, the 3D representation under assessment including a plurality of frames with corresponding frames in the reference 3D representation, the first plurality of updated virtual camera positions being used for projecting a first frame of the 3D representation under assessment and a first corresponding frame of the reference 3D representation;
- calculate a first plurality of assessment scores respectively associated with the first plurality of updated virtual camera positions based on the first plurality of reference 2D images and the first plurality of assessment 2D images;
- calculate a weighted average assessment score of the first plurality of assessment scores; and
- determine a second plurality of updated virtual camera positions of the plurality of virtual cameras, the second plurality of updated virtual camera positions being used for projecting a second frame of the 3D representation under assessment and a second corresponding frame of the reference 3D representation.

13. The apparatus of claim 12, wherein the processing circuitry is configured to:
- apply a rotation matrix of the position change of one of the plurality of virtual cameras to a prior virtual camera position of the one of the plurality of virtual cameras to determine the updated virtual camera position of the one of the plurality of virtual cameras.

14. The apparatus of claim 13, wherein the processing circuitry is configured to:
- receive the rotation matrix as input parameters via a user interface.

15. The apparatus of claim 12, wherein the first plurality of updated virtual camera positions are evenly sampled on a sphere in the 3D space or are randomly sampled on the sphere in the 3D space.

16. The apparatus of claim 12, wherein the processing circuitry is configured to:
- determine the second plurality of updated virtual camera positions of the plurality of virtual cameras based on a camera movement path.

17. A non-transitory computer-readable storage medium storing instructions which when executed by a processor cause the processor to perform:
- determining a first plurality of updated virtual camera positions in response to position changes of a plurality of virtual cameras for projection from a three-dimensional (3D) space to a two-dimensional (2D) space;
- projecting a reference 3D representation according to the first plurality of updated virtual camera positions to generate a first plurality of reference 2D images associated with the first plurality of updated virtual camera positions;
- projecting a 3D representation under assessment according to the first plurality of updated virtual camera positions to generate a first plurality of assessment 2D images associated with the first plurality of updated virtual camera positions, the 3D representation under assessment including a plurality of frames with corresponding frames in the reference 3D representation, the first plurality of updated virtual camera positions being used for projecting a first frame of the 3D representation under assessment and a first corresponding frame of the reference 3D representation;
- calculating a first plurality of assessment scores respectively associated with the first plurality of updated virtual camera positions based on the first plurality of reference 2D images and the first plurality of assessment 2D images;

calculating a weighted average assessment score of the first plurality of assessment scores; and determining a second plurality of updated virtual camera positions of the plurality of virtual cameras, the second plurality of updated virtual camera positions being used for projecting a second frame of the 3D representation under assessment and a second corresponding frame of the reference 3D representation.

18. The non-transitory computer-readable storage medium of claim 17, wherein the determining the first plurality of updated virtual camera positions further comprises:

applying a rotation matrix of the position change of one of the plurality of virtual cameras to a prior virtual camera position of the one of the plurality of virtual cameras to determine the updated virtual camera position of the one of the plurality of virtual cameras.

19. The non-transitory computer-readable storage medium of claim 18, wherein the instructions further cause the processor to perform:

receiving the rotation matrix as input parameters via a user interface.

20. The non-transitory computer-readable storage medium of claim 17, wherein the first plurality of updated virtual camera positions are evenly sampled on a sphere in the 3D space or are randomly sampled on the sphere in the 3D space.

\* \* \* \* \*